A. T. DAWSON & G. T. BUCKHAM.
HANG FIRE DEVICE FOR BREECH LOADING ORDNANCE.
APPLICATION FILED JAN. 10, 1910.
1,078,665.
Patented Nov. 18, 1913.
4 SHEETS—SHEET 1.
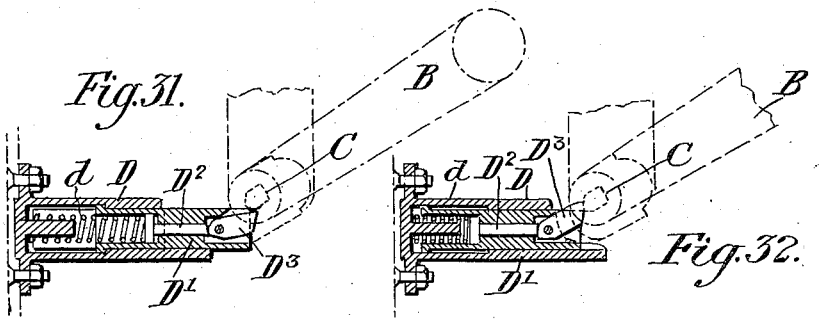
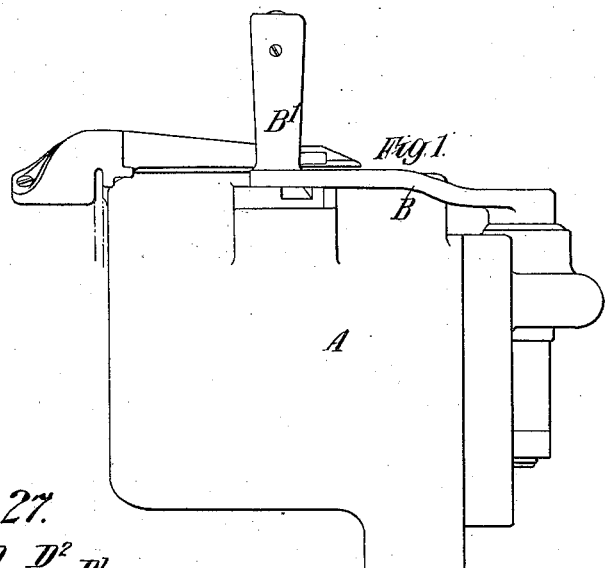
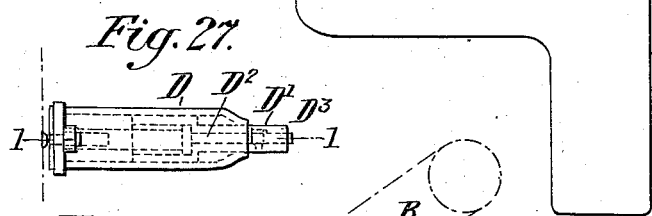
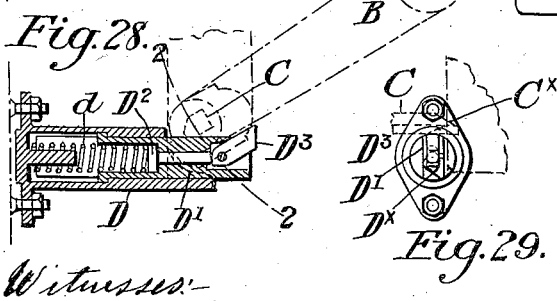
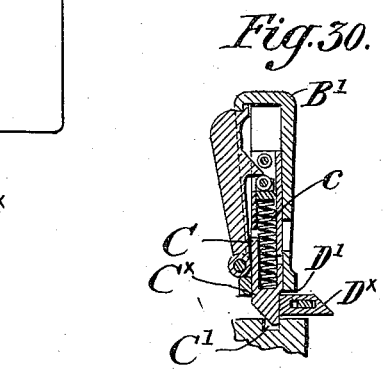

A. T. DAWSON & G. T. BUCKHAM.
HANG FIRE DEVICE FOR BREECH LOADING ORDNANCE.
APPLICATION FILED JAN. 10, 1910.
1,078,665.
Patented Nov. 18, 1913.
4 SHEETS—SHEET 2.
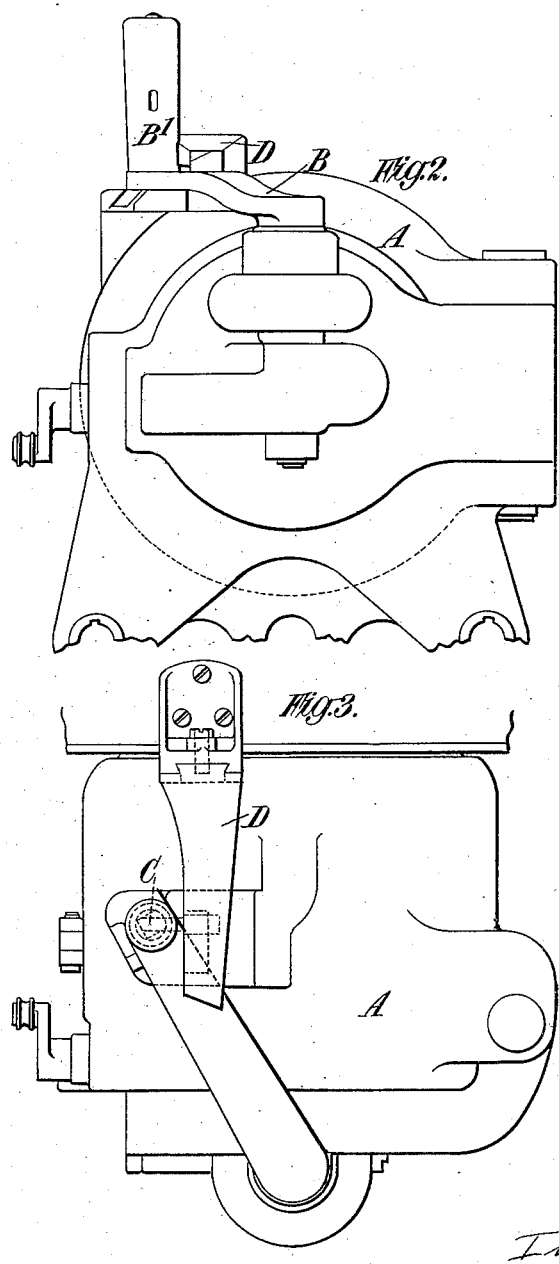

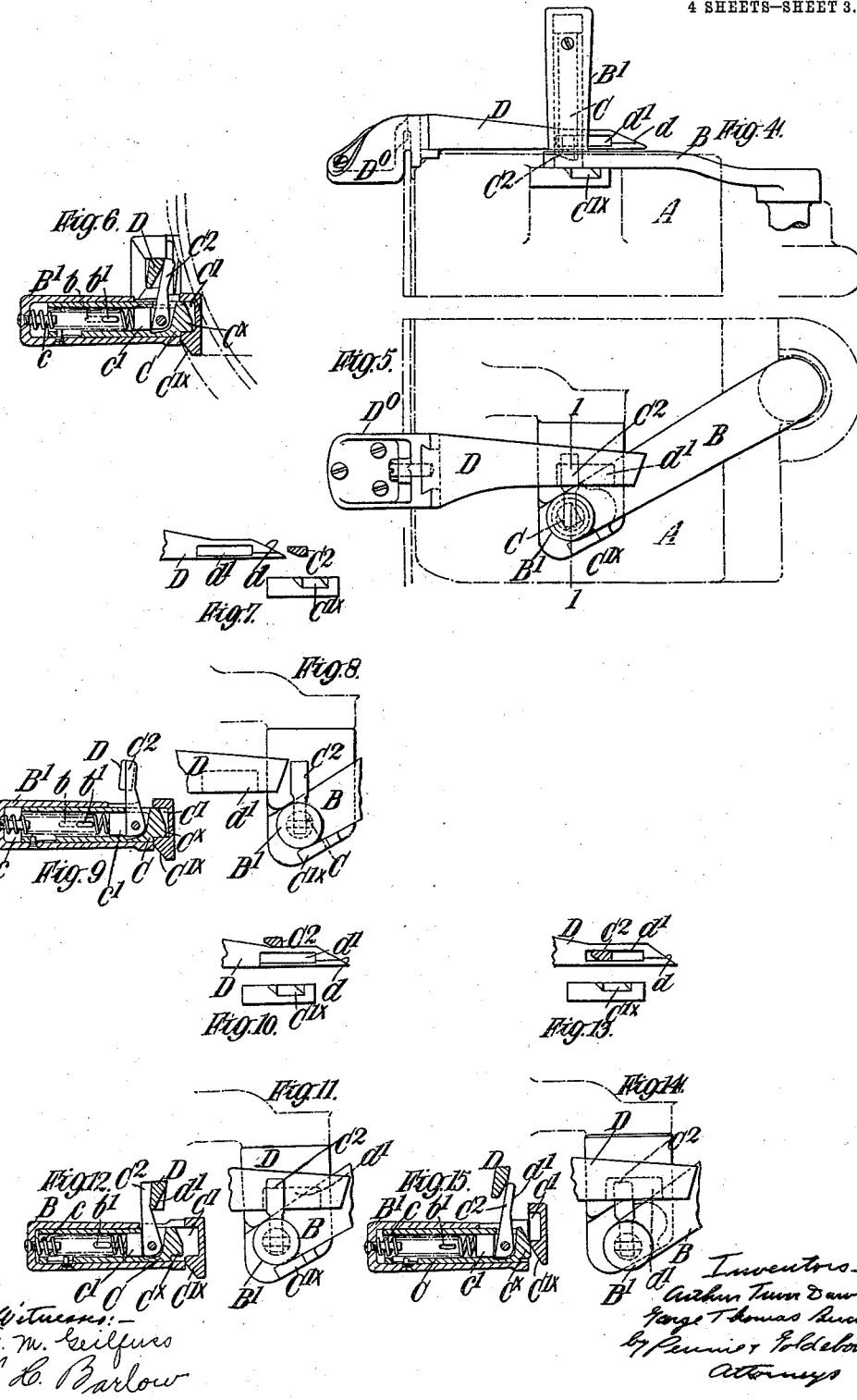

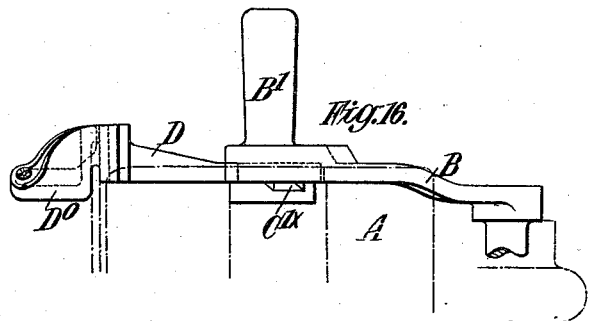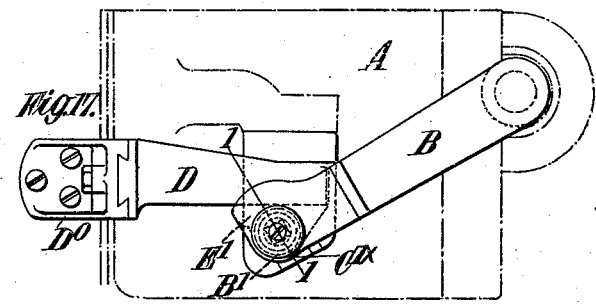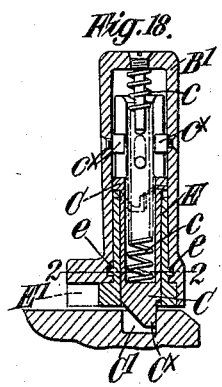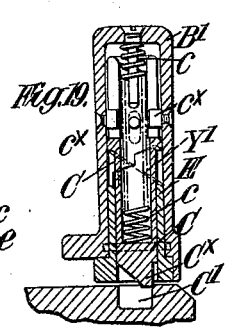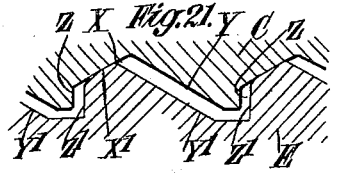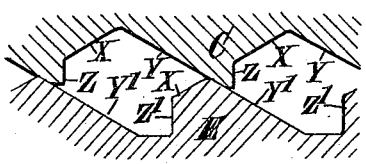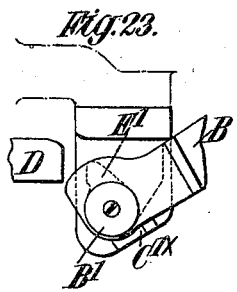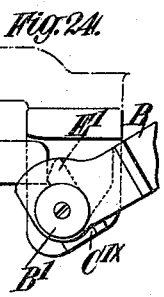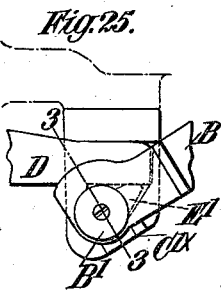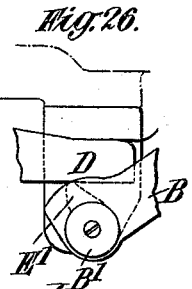

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, ENGLAND.

HANG-FIRE DEVICE FOR BREECH-LOADING ORDNANCE.

1,078,665.     Specification of Letters Patent.     Patented Nov. 18, 1913.

Application filed January 10, 1910. Serial No. 537,155.

*To all whom it may concern:*

Be it known that we, ARTHUR TREVOR DAWSON, knight, and GEORGE THOMAS BUCKHAM, both subjects of the King of Great Britain, residing at 32 Victoria street, Westminster, in the county of London, England, have invented certain new and useful Improvements in Hang-Fire Devices for Breech-Loading Ordnance, of which the following is a specification.

This invention relates to apparatus known as hang fire devices which are used with breech loading guns for the purpose of preventing the breech from being opened by the breech actuating mechanism in the usual way, if for any reason the gun fails to become discharged after operating the firing mechanism.

According to this invention the improved hang fire device comprises a spring catch situated within the lever that operates the breech mechanism, and a contrivance affixed to a non-recoiling part of the mounting, the said catch being adapted to engage in a pocket formed in the gun. The said spring catch is in engagement with said pocket during recoil and the said contrivance is of such a character that, unless the gun recoils, it will prevent the catch from being moved from its pocket and the breech actuating lever from being operated to open the breech, without first releasing the catch by the use of a special tool or a portion of the gear not otherwise used in operating the mechanism and requiring a special movement. Thus in the event of a "hang fire" occurring, safety is insured without interfering with the ease and rapidity of the ordinary working of the gun. By means of our improved device the spring catch is, after recoil of the gun, liberated from its pocket so that the breech actuating hand lever can be operated; the latter is not however positively displaced to effect the initial opening of the breech as has been proposed in a hang fire device in which a spring catch is situated in the handle of the breech actuating lever and adapted to normally engage in a pocket on a part attached to the cradle so that immediately the gun recoils the said catch is liberated from its pocket.

In order that our said invention may be clearly understood and readily carried into effect, we will describe the same more fully with reference to the accompanying drawings, in which:—

Figure 1 is a side elevation. Fig. 2 is an end view, and Fig. 3 a plan of the breech end of a quick firing gun with one form of our improved hang fire device applied thereto. Fig. 4 is a side elevation. Fig. 5 is a plan, and Fig. 6 is a vertical section on the line 1, 1 of Fig. 5, showing the operative parts of this form of our improved hang fire device in the normal or locked position. Figs. 7, 8 and 9 are views similar to Figs. 4, 5 and 6 showing the parts of the hang fire device in the position they occupy during the initial movement of the gun in recoiling after firing. Figs. 10, 11 and 12 are similar views showing the parts of the hang fire device in the position they occupy when the gun has returned to the run out position after recoiling, and Figs. 13, 14 and 15 are also similar views showing the position of the parts of the hang fire device when the breech actuating lever is being returned to the normal or locked position during the closing of the breech. Figs. 16 and 17 are respectively a side elevation and a plan of the breech end of a gun showing a modified construction of our improved hang fire device, the parts being in the locked position. Figs. 18 and 19 are vertical sections on the line 1, 1 of Fig. 17 drawn on a larger scale and showing the spring catch in two different positions. Fig. 20 is a cross section on the line 2, 2 of Fig. 18. Figs. 21 and 22 are enlarged diagrammatic views showing developments of two coöperating parts of the spring catch in different positions. Figs. 23 to 26 are plans showing the spring catch in several different positions relatively to the contrivance on the non-recoiling part of the gun mounting; Fig. 23 representing these parts in the position they occupy during recoil of the gun; Fig. 24 representing the said parts in the position they occupy during the running out of the gun after recoil; Fig. 25 representing the said parts in the position they occupy when the gun has returned to the run out position; and Fig. 26 representing the said parts in the position they occupy when the breech operating lever has nearly reached the locked position in closing the breech. Fig. 27 is a side elevation, Fig. 28 a horizontal section on the line 1, 1 of Fig. 27, and Fig. 29 an end elevation of another modified form of the contrivance carried by a non-recoiling part of the gun mounting. Fig. 30 is a vertical section on the line 2, 2 of Fig. 28, showing the spring catch in the locked position. Figs. 31 and 32 are views similar to Fig. 28 showing the parts in the position they respectively occupy during the recoil of the gun, and at the end of the return or run out movement of the gun.

In all these figures like letters of reference indicate similar parts.

A is the breech end of the gun, B the breech actuating lever, and B' the handle for operating the same.

C is the spring catch having a beveled nose $C^x$. C' is a recess or pocket formed in the gun for the reception of the nose $C^x$, and $C'^x$ is a beveled face leading to the said recess. In Figs. 1 to 32 the said catch is situated in the handle B' of the hand lever B.

D is the contrivance which is fixed to the cradle or other non-recoiling part of the mounting for coöperating with the said spring controlled catch C.

Referring more particularly to the constructional form of our improved hang fire device illustrated in Figs. 1 to 15, the aforesaid spring catch C is in the form of a plunger which fits within the hollow handle B' of the breech actuating lever B with a capability of sliding vertically therein. The spring c normally tends to keep the said plunger pressed in an outward or downward direction with the beveled nose $C^x$ thereon projecting to a limited extent from the lower end of the aforesaid handle B so as to be free to engage with the recess or pocket C' which is formed for its reception in the gun when the breech is closed as is well understood. The said plunger is provided with a hinged arm or pawl $C^2$ near its lower end which pawl is subject to the action of the said spring through the intervention of the plug c' and projects laterally through suitable slots in the plunger and the containing handle B', into a position to engage with the aforesaid contrivance D which in the example shown is in the form of a horn or arm projecting rearwardly from the gun cradle to which it is connected by a bracket D° (Figs. 1 to 3). This horn may be of rectangular section and occupies such a position relatively to the pawl $C^2$ that when the mechanism is in the closed position shown in Figs. 4, 5 and 6 the pawl $C^2$ lies beneath the horn D so that the catch is retained in engagement with its pocket or recess C' in the gun and the breech actuating lever B cannot then be operated without resorting to the use of a special tool or of a part of the catch not otherwise used in the operation of the mechanism for lifting the catch-plunger C. For thus lifting the catch-plunger the handle B' is formed with a vertical slot b and the plunger C with a hole b' coinciding with the lower end of the said slot b when the catch engages with the pocket or recess C'. By inserting a steel pin through the slot b and into the hole b', the plunger C can be lifted by the said pin as is well understood. Instead of employing the said special tool, the pawl $C^2$ may be formed with a finger which protrudes from the handle thus enabling the plunger to be lifted by a movement which is not necessary in the usual operation of the mechanism. On firing the gun the pawl $C^2$ slips away from the said horn during the recoil and the action of the plunger-spring c and the plug c' causes the pawl to be rocked slightly about its pivot to assume the position shown in Figs. 7, 8 and 9 which is such that on the return movement of the gun, the said pawl will be guided by an incline d on the horn, Fig. 7, into a position above the latter as illustrated in Figs. 10, 11 and 12. During this movement of the pawl it operates to lift the catch C clear of the pocket or recess C', so that the breech actuating lever B is free to be moved to open the breech. On again closing the breech the pawl $C^2$ will be guided beneath the said horn D by an incline d' on the latter and the plunger will be lifted by the engagement of the beveled nose C' with the beveled face $C'^x$ on the gun and then reëngage with its pocket or recess C'. Figs. 13, 14 and 15 show the parts in the position they occupy just before the above described locking movement is completed. Further movement in the locking direction will cause the mechanism to once more assume the locked position shown in Figs. 4, 5 and 6 from which it can only be released by the recoil movement of the gun or by the aforesaid special tool.

In another constructional form of our improved hang fire device shown in Figs. 16 to 26 the spring catch is as before in the form of a hollow plunger C having at its lower end the beveled nose $C^x$ for engaging with the pocket or recess C' in the gun. The plunger C is prevented from rotating by key pins $c^x$ and is surrounded by a rotary collar or sleeve E having a lateral projection or arm E' and provided with flanges e which work in grooves to form a bayonet joint for detachably connecting it with the handle B' of the breech actuating lever B in such manner that it can turn within certain limits without moving axially. The said plunger C is provided at its upper end with a portion of larger diameter which is furnished on its under surface with inclines or helical faces which coöperate with corresponding inclines or helical faces on the said rotary collar or sleeve E. The inclines or helical faces on the plunger C comprise two oppositely inclined surfaces X, Y which engage with corresponding surfaces X', Y', on the collar or sleeve E. Vertical faces Z, Z' are formed on the plunger and collar respectively and act as shoulders to prevent rotary movement beyond a certain point in one direction. When the breech actuating lever B is in its closed position, the spring catch C operates through the intervention of the aforesaid inclines or helical faces to turn the collar or sleeve E in a direction to bring its projection or arm E' into lateral contact with the horn or arm D on the non-recoiling part of the mounting and permits the nose $C^x$ of the catch C to engage with the pocket or recess C' in the gun, thus locking the breech actuating lever B in its closed position. The parts are then in the position shown in Figs. 16, 17, 18 and 20, the aforesaid inclines or helical faces being as shown in Fig. 21. When the gun is fired and recoils the said projection or arm E' leaves the horn D and the catch C under the influences of its spring c and the aforesaid inclines or helical faces causes the collar or sleeve E to turn still farther in a clockwise direction when viewed from above until the shoulders Y and Y' are in contact. The projection or arm E' is now in the position shown in Fig. 23, so that it will engage with the end of the said horn D when the gun is returning to the firing position as shown in Fig. 24. During this return movement the said collar or sleeve E is caused to move farther in the aforesaid clockwise direction and by so doing will finally, through the intervention of the inclines or helical faces Y, Y' cause the catch C to be elevated to a sufficient extent to liberate it from engagement with the pocket or recess C' in the gun as shown in Figs. 19 and 22. The projection or arm E' is then in the position shown in Fig. 25. The breech actuating lever B will thus be liberated so that it can be actuated to open the breech. Immediately the breech actuating lever B is rotated carrying the arm E' on the rotary collar E away from the horn D the action of the plunger spring, through the medium of the helices Y and Y' causes the arm E' to rotate in an anti-clockwise direction into the position shown in Fig. 26. Upon moving the breech actuating lever B inwardly to close the breech the aforesaid projection or arm E' on the rotary collar or sleeve E will come into lateral contact with the horn D as shown in Fig. 26 and the rotary collar or sleeve E will on further movement of the actuating lever B be turned farther in an anti-clockwise direction into the position for locking the catch in engagement with its pocket or recess as shown in Figs. 16, 17 and 18. So long as the gun does not recoil the catch C remains locked in engagement with the said pocket or recess C' and cannot be disengaged therefrom without the use of a special tool or without actuating a part of the catch not otherwise used in the operation of the mechanism similar to that explained in connection with the arrangement shown in Figs. 1 to 15.

In order to enable the catch C to be disconnected from the handle B' of the breech actuating lever B the said catch must be lifted by the aforesaid tool or the part of the catch above mentioned to an extent sufficient to disengage the inclines or helical faces thereon from the inclines or helical faces on the said collar or sleeve E, whereby the latter will be free to be turned by means of its projection E' into a position to disengage the bayonet joint, whereupon the collar or sleeve E can be axially removed from the handle B' and the other parts rendered free to be detached.

In another constructional form of our improved hang fire device shown in Figs. 27 to 32, the spring catch C which is situated in the handle of the breech actuating lever is similar to that above stated but capable of being lifted by a lever grip in an analogous manner to that heretofore proposed by us. The contrivance D on the non-recoiling part of the mounting with which the catch C is adapted to coöperate, comprises in this case a cylindrical piece or socket fitted with a plunger D' that has a second or inner plunger $D^2$ therein for operating a pawl $D^3$ pivoted to the first or outer plunger D', these various parts being under the control of a spiral spring d contained within the said cylindrical piece or socket. When the breech actuating lever B is being moved to its breech closing position after the gun has been loaded, the beveled nose $C^x$ of the spring catch C strikes against an inclined face $D^x$ of the plunger D' so that the spring catch is lifted over the said plunger and drops behind the same into the pocket C'. The parts are now in the position shown in Figs. 27 to 30 in which position the breech actuating lever remains locked as the catch C cannot be lifted to a sufficient height to clear the plunger D' without the use of a special tool, or without actuating a part of the catch not otherwise used in the operation of the mechanism. On firing and recoil of the gun, the aforesaid pawl $D^3$ gives way to the spring catch C as shown in Fig. 31 and regains its original position under the action of the spiral spring d. It thus lies in the path of the spring catch C on the return movement of the gun to the firing position and enables the plungers D', $D^2$, to be displaced through the intervention of the pawl $D^3$ into the position shown in Fig. 32. The breech actuating lever B can now be operated to open the breech, and as soon as the catch C clears the pawl $D^3$, the plungers D', D² return to the normal position under the influence of the spring d. After the breech has been actuated the lever B is returned to the position shown in Fig. 28 as before described. In the event of the gun failing to recoil after actuating the firing mechanism, the spring catch C does not change its position and therefore still lies laterally against the outer plunger D' thus preventing the breech actuating lever from being actuated to open the breech until the spring catch C is released by means of a special tool, or a part of the catch not otherwise used in the operation of the mechanism.

Although the said hang fire device has been described above in connection with a breech actuating lever arranged at the upper part of the gun, the said device is equally applicable to a breech actuating lever occupying other positions.

What we claim and desire to secure by Letters Patent of the United States is:—

1. In a hang fire device for breech loading guns, the combination with the breech actuating hand lever, of a catch situated on the breech actuating lever and adapted to engage in a pocket formed in the gun, a contrivance affixed to a non-recoiling part of the gun, and a projection on said catch adapted to coöperate with said contrivance so that the catch is retained in its pocket until the gun has recoiled after firing.

2. In a hang fire device for breech loading guns, the combination with the breech actuating hand lever, of a catch situated on the said breech actuating lever, a contrivance affixed to a non-recoiling part of the gun, and a device on the gun with which the catch is adapted to engage, said contrivance on the runout of the gun positively moving the catch out of engagement with said device.

3. In a hang fire device for breech loading guns, the combination with the breech actuating hand lever of a spring catch situated on the breech actuating lever and adapted to engage in a pocket formed in the gun, a horn affixed to a non-recoiling part of the gun and having an inclined nose, and means adapted to coöperate with said horn so that the catch is retained in its pocket until the gun has recoiled.

4. In a hang fire device for breech loading guns, the combination with the breech actuating hand lever, of a spring catch situated within the handle of the breech actuating lever, a device on the gun with which said catch is adapted to engage, a horn affixed to a non-recoiling part of the gun and having an inclined nose, and a pawl attached to said spring catch, said pawl coöperating with the said horn to retain the catch in engagement with the aforesaid device until the gun has recoiled.

In testimony whereof we affix our signatures in presence of two witnesses.

ARTHUR TREVOR DAWSON.
GEORGE THOMAS BUCKHAM.

Witnesses:
HENRY KING,
ALFRED PEAKS.

---

Copies of this patent may be obtained for five cents each, by addressing the "Commissioner of Patents, Washington, D. C."